United States Patent Office 3,534,095
Patented Oct. 13, 1970

3,534,095
PROCESS FOR THE PREPARATION OF MAGNESIUM AND/OR CALCIUM SALTS OF FUMARIC ACID, IF DESIRED IN THE FORM OF DOUBLE SALTS WITH PHOSPHORIC ACID AND/OR WITH WATER-SOLUBLE ALIPHATIC CARBOXYLIC ACID
Ernst Fingas, Hamburg, Germany, assignor to Chemische Fabrik Marienfelde G.m.b.H., Hamburg, Germany
No Drawing. Filed Apr. 25, 1967, Ser. No. 633,378
Claims priority, application Germany, May 7, 1966, C 39,007
Int. Cl. C07c 57/14, 59/08, 59/16
U.S. Cl. 260—535    3 Claims

ABSTRACT OF THE DISCLOSURE

Fumaric acid salts with magnesium or calcium are formed by mixing magnesium oxide and/or calcium oxide with fumaric acid in dry condition, and admixing to the oxide water, which is allowed to evaporate. Magnesium fumarate of the formula $Mg(C_4H_2O_4) \cdot 2H_2O$ is, for example, thus formed. In substantially the same manner, double salts of the fumarate with phosphoric acid or with water-soluble aliphatic carboxylic acids, can be formed.

---

This invention relates to a process for the preparation of magnesium and/or calcium salts of fumaric acid, if desired in the form of double salts with phosphoric acid and/or with water-soluble aliphatic carboxylic acids.

The salts or compounds embodying this invention are useful as additions to fodder for animals. A specific physiological effect and an increased retention are attributed to said salts of fumaric acid. The latter is of particular importance in feeding in the case of the magnesium salts, because only a low quota of about 10–20% can be observed generally in magnesium salts. In spite of this, the corresponding salts of fumaric acid could not be used in feeding, because the industrial production of alkaline earth salts of fumaric acid causes considerable difficulties.

It has been known to prepare the trihydrate of the ferro-salt of fumaric acid, and the preparation of the anhydrous ferro-salt of fumaric acid was also known. However, in the preparation of magnesium salts of fumaric acid by reacting, in an analogous process, a molar solution of sodium fumarate with a saturated molar solution of magnesium sulfate, difficulties occur, due to the solubility of magnesium fumarate. First, no crystallization of salt occurs and not until concentration of the solution will crystallization occur. However, as then the saturation limit of sodium sulfate is also attained, a mixture of fumarate and sulfate crystals will be obtained.

On the other hand, as fumaric acid is almost insoluble in water, neutralization of an aqueous fumaric acid solution is likewise not possible.

It has now been unexpectedly found according to the present invention that magnesium as well as calcium salts of fumaric acid—if desired in the form of double salts of phosphoric acid and/or aliphatic carboxylic acids can be prepared in the following manner:

The oxide or hydroxide of magnesium or calcium are mixed in dry condition with an equivalent amount of fumaric acid, with kneading or stirring, with 1–10 mols of water, in which—in the case of preparing double salts—the water soluble aliphatic acids are dissolved.

The reaction takes place with strong production of heat and with evolution of steam, whereby in the use of magnesium compounds magnesium-fumarate is formed. This fumarate is a dry non-hygroscopic salt which does not contain water of hydration. In X-ray diagrams some new lines can be seen, which can be derived from magnesium fumarate only because they are not yet described or shown in prior art X-rays.

Double salts can be formed, in addition to phosphoric acid, for example, also with the following acids: acetic acid, lactic acid, propionic acid, citric acid, tartaric acid and malic acid. Formic acid can be used under certain circumstances.

Biological testing was carried out with magnesium-fumarate-phosphate and magnesium-aceto-fumarate. In the case of calcium- and phosphorus-equilization (Ca:P– 2:1) and constant magnesium, the following values were obtained with magnesium double salts:

|   | Magnesium-acetofumarate, percent | Magnesium-fumarate-phosphate, percent |
|---|---|---|
| Forage utilization | 100 | 97 |
| Ca-retention | 100 | 104 |
| Mg-retention | 100 | 96 |
| P-retention | 100 | 109 |

According to the above results, the biological effect of these Mg-salts is about equal. However, depending on whether—from the point of view of feeding—an increase of Ca- or Mg- or P-retention is desired, the use of one or the other salt is more appropriate.

In carrying out the present invention in all of the following examples the isomeric maleic acid can be used, whereby the maleic acid salts can be obtained, by the same procedure.

In the following various specific examples are described, to which the examples are not limited.

EXAMPLE 1

In an open kneading mixer 4.0 kg. of magnesium oxide are mixed with 11.6 kg. of fumaric acid. To the dry mixture of these two substances 5.4 kg. water are added in molecular proportion. First, a doughy mass is then formed, which grows hot quickly, without supply of heat from the outside and forms a dry mass of salt in further 20–30 minutes with the evolution of steam. This salt is is not hygroscopic, has a neutral reaction and contains about 14% by weight of magnesium and 65% by weight of fumaric acid. It corresponds to the formula

$$Mg(C_4H_2O_4) \cdot 2H_2O$$

EXAMPLE 2

In the mixer used in Example 1, 7.4 kg. of calcium hydroxide (calcium hydroxide from marble) are mixed with 11.6 kg. of fumaric acid. This dry mixture when reacted with 3.6 kg. of water, forms a doughy mass with the evolution of steam. After the reaction, a grey-white neutral salt is obtained, which contains about 21% by weight of calcium and has the formula

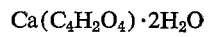
$$Ca(C_4H_2O_4) \cdot 2H_2O$$

EXAMPLE 3

2 kg. of magnesium oxide, 3.7 kg. of calcium hydroide and 11.6 kg. of fumaric acid are mixed in dry condition. The mass is then mixed with 3.6 kg. of water. The same reaction as in the Examples 1 and 2 takes place and the resulting magnesium-calcium-fumarate contains about 7% Mg and 11% Ca, by weight.

EXAMPLE 4

In order to prepare magnesium-aceto-fumarate — a compound of magnesium with fumaric acid and acetic acid—in a mixer as described in Examples 1–3 first 8 kg. magnesium oxide and 11.6 kg. fumaric acid are mixed in dry condition. Subsequently, with the dry mixture 20 kg. of dilute acetic acid of 60% concentration are mixed.

After evolution of heat, and evaporation of steam a dry salt results, consisting of the dry components magnesium, fumaric acid and acetic acid. This salt has a sweetish taste and a weak odor of acetic acid.

EXAMPLE 5

Magnesium fumarate phosphate is formed if a mixture of 8 kg. magnesium oxide with 11.6 kg. fumaric acid is reacted with 20 kg. of dilute phosphoric acid of 50% by weight of concentration.

EXAMPLE 6

Dilute lactic acid is prepared from 8.5 kg. of concentrated lactic acid with 4.0 kg. of water, and a dry mixture of 6 kg. magnesium oxide and 5.8 kg. fumaric acid. Magnesium-fumarate-lactate is thus formed in the manner described in the previous examples.

EXAMPLE 7

By reacting a dry mixture of 3.7 kg. calcium hydroxide from marble with 2.3 kg. fumaric acid with 8.4 kg. of aqueoues citric acid solution of 50%, a dry calcium-fumarate-citrate is obtained. The procedure is the same as in the previous examples.

EXAMPLE 8

Calcium-magnesium-fumarate-propionate can be prepared by reacting with a dry mixture of 11.6 kg. fumaric acid, 4.0 kg. magensium oxide and 5.6 kg. of calcium oxide, 15 kg. of propionic acid diluted with 5 kg. of water.

The parts and percent are herein by weight, if not otherwise stated.

What is claimed is:

1. Process for preparing fumaric acid salts of a metal selected from the group consisting of magnesium and calcium, essentially consisting of mixing in dry condition a metal compound selected from the group consisting of magnesium hydroxide, magnesium oxide, calcium hydroxide and calcium oxide with dry fumaric acid, the reactants being used in the ratio of 1 mol of the metal compound for 1 mol of the fumaric acid and mixing the dry mixture thus formed with 1–10 mols of water, the reaction of fumarate formation taking place with production of heat and with evolution of steam, without external heating.

2. Process for preparing double salts from fumaric acid, citric acid, tartaric acid and malic acid, with a metal of phosphoric acid, acetic acid, propionic acid, lactic acid, citric acid, tartaric acid and malic acid, with a metal selected from the group consisting of magnesium and calcium essentially consisting of mixing in dry condition a metal compound selected from the group consisting of magnesium hydroxide, magnesium oxide, calcium hydroxide and calcium oxide, with fumaric acid, mixing 1 mol of the dry mixture of metal compound with fumaric acid, with 1–10 mols of water, in which said second acid is dissolved, the reactants being used in the ratio of equivalent molar amounts of the metal compound and the sum of acids, the reaction of salt formation taking place with the production of heat and with evolution of steam, without external heating.

3. Process for preparing maleic acid salts of a metal selected from the group consisting of magnesium and calcium, essentially consisting of mixing in dry condition a metal compound selected from the group consisting of magnesium hydroxide, magnesium oxide, calcium hydroxide and calcium oxide with dry maleic acid, the reactants being used in the ratio of 1 mol of the metal compound for 1 mol of the maleic acid, and mixing 1 mol of the dry mixture formed with 1–10 mols of water, the formation of maleic acid salt formation taking place with the production of heat and with evolution of steam, without external heating.

References Cited

UNITED STATES PATENTS

| 2,895,990 | 7/1959 | Larrison et al. | 260—541 |
| 3,365,488 | 1/1968 | Fernholz et al. | 260—526 |

FOREIGN PATENTS

| 443,705 | 2/1936 | Great Britain. |
| 519,836 | 4/1940 | Great Britain. |
| 4,023,784 | 10/1965 | Japan. |

LORRAINE A. WEINBERGER, Primary Examiner

V. GARNER, Assistant Examiner

U.S. Cl. X.R.

260—537